E. A. HAMMETT.
COMPRESSION TESTING DEVICE.
APPLICATION FILED JUNE 28, 1919.
1,403,685.
Patented Jan. 17, 1922.
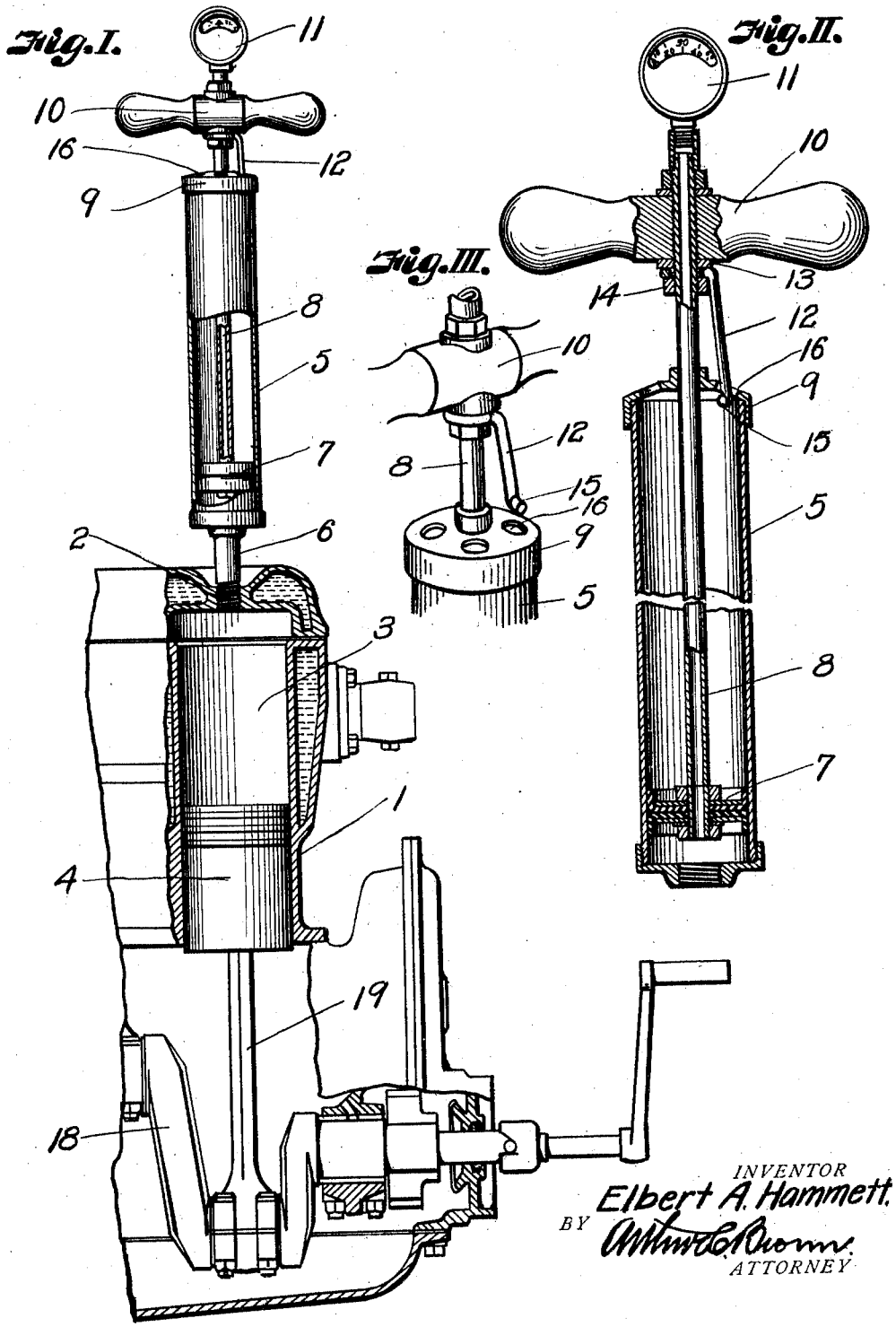
INVENTOR
Elbert A. Hammett,
BY
Arthur C. Brown
ATTORNEY

UNITED STATES PATENT OFFICE.

ELBERT A. HAMMETT, OF KANSAS CITY, MISSOURI.

COMPRESSION-TESTING DEVICE.

1,403,685.        Specification of Letters Patent.     Patented Jan. 17, 1922.

Application filed June 28, 1919. Serial No. 307,325.

*To all whom it may concern:*

Be it known that I, ELBERT A. HAMMETT, a citizen of the United States, residing at Kansas City, in the county of Jackson and State of Missouri, have invented certain new and useful Improvements in Compression-Testing Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to engine testers and primarily the device is intended to enable one to determine the amount of compression in the cylinder of a reciprocatory piston engine. For example, it is sometimes desirable to determine the amount of compression generated in the combustion chamber of an explosion engine and I have provided means whereby this may be determined without complicated apparatus and without changing the construction of the engine.

In an application filed by me on or about the 10th day of March, 1919, Serial No. 281,894, I described at length a method for locating knocks in engines by varying the compression in the combustion chamber and as a convenient means for varying the pressure, I showed a pump adapted to be hand operated and adapted to be attached to the engine cylinder by screwing a nipple into the spark plug opening.

I have discovered means for utilizing such a pump as a tester for determining the amount of compression in the combustion chamber cylinder, the result being accomplished by a slight modification of the pump which does not destroy the effectiveness of the pump for the original purpose intended (that is, for locating knocks, etc.) but which lends the additional function thereto so that the single tool may be utilized for a multiplicity of purposes.

In carrying out my invention I provide a hollow pump piston rod and at the upper end thereof I attach a pressure gauge and I also provide means for holding the piston rigid with respect to the cylinder so that when the tool is in place and the crank shaft is turned over so that the piston moves into compression stroke, a direct reading may be had upon the dial or pressure gauge carried by the pump handle and if it is desired to locate knocks, etc., the holding or locking mechanism for the piston may be released and the device may be operated in the usual way to locate the knocks.

In the drawings,

Fig. I is a sectional view through an engine to which my invention is attached, part of the device being shown in section and part in elevation.

Fig. II is a vertical longitudinal sectional view through the testing apparatus, and Fig. III is a fragmentary perspective view of the same, particularly illustrating the locking device.

Referring now to the drawings by numerals of reference:

1 designates a reciprocatory explosion engine of conventional design, provided with the usual spark plug opening 2, and a cylinder 3 provided with a piston 4.

5 designates the cylinder of a pump having a threaded nozzle 6 which may partake of any form adapted to be threaded into the opening 2. The cylinder 5 carries a piston 7 provided with a hollow piston rod 8 guided in a cap 9 of the cylinder 5 and extending beyond the cylinder and carrying a handle 10 by means of which the hollow rod 8 may be actuated to actuate the piston 7. On the outer end of rod 8 is a pressure gauge 11, which may be of any approved construction, and locked to the rod is a piston-securing means or lock 12, shown as consisting of a wire having one end bent around the rod 8 and secured thereto by the fastening devices 13 and 14, the other end of the locking device or wire 12 having a right angularly projecting cap-engaging finger or means 15 to engage the cap 9 through the openings 16, common to such pumps. When the device is adapted to be used for varying the pressure in the combustion chamber of the cylinder 3, the locking device 12 is released from engagement with the cap 9 of the cylinder 5 and the cylinder may be reciprocated by operating the handle 10.

When, however, it is desired to test for compression, the projection 15 will be caused to engage the cap through one of the openings 16 so that the piston cannot move. Then after the crank 18 is turned over so that the connecting rod 19 actuates the piston 4 to compression stroke, the pressure in the combustion chamber will be exerted against the pressure gauge through the tubular rod 8 and indicate, by direct reading, the amount of compression.

Therefore, it will be apparent that the amount of compression in the cylinder may be readily ascertained and that it may be determined by a device of well-known construction by a slight modification. Therefore, the device is not only applicable for testing compression of engine cylinders but for a multiplicity of other purposes.

What I claim and desire to secure by Letters-Patent is:

1. In a device for testing the compression of engine cylinders, a cylindrical member having means for communicating with the cylinder of the engine, a piston in said cylindrical member, a hollow piston rod projecting through the cylindrical member and the cap thereof, a pressure gauge on said rod, and means for locking the piston against longitudinal movement with respect to the cylindrical member, said means comprising a wire secured at one end to the piston rod and having a finger for locking engagement with the cap whereby the piston rod may be temporarily held rigid with respect to the cylindrical member.

2. In a device for testing the compression of engine cylinders, a cylindrical member having means for communicating with the cylinder of the engine, a piston in said cylindrical member, a hollow piston rod projecting through the piston and the cylindrical member, a pressure responsive gauge chamber communicating with the outer end of the hollow rod and having a dial thereon and an indicator responsive to pressure of said chamber whereby pressure within the cylinder will be indicated upon the dial, and means on the piston rod for operating the piston to build up pressure in the cylindrical member and within the hollow piston rod.

3. In a device for testing the compression of engine cylinders, a cylindrical member having means for communicating with the cylinder of the engine, a piston in said cylindrical member, a hollow piston rod projecting through the cylindrical member, a pressure responsive gauge chamber communicating with the hollow piston rod, and means for locking the piston against longitudinal movement with respect to the cylindrical member, said means comprising a releasable connection between the piston rod and the cylinder whereby the piston may be temporarily held rigid with respect to the cylinder so that the pressure in the cylinder will be indicated on the pressure responsive gauge.

4. In a device for testing the compression in engine cylinders, a cylinder, a nozzle on the end of the cylinder for connection with an engine cylinder, a piston having reciprocating movement in the first mentioned cylinder, a hollow piston rod extending through the piston and having a pressure gauge at one end communicating with said piston rod, a handle on the piston rod for reciprocating the piston, and a locking device for effecting a rigid connection between the piston and the cylinder when the piston is at the limit of its stroke toward the nozzle so that the pressure built up by the piston within the cylinder may be registered on the pressure gauge.

5. In a device for testing the compression of engine cylinders, a pump comprising a cylinder, a piston and a hollow cylinder rod projecting through the piston, a pressure gauge on the end of the piston rod outside the cylinder, a handle for operating said pump, and means for temporarily locking the piston rod against movement when the piston is at the limit of its compression stroke whereby the pressure on the compression side of the piston may be indicated on the pressure gauge.

In testimony whereof I affix my signature.

ELBERT A. HAMMETT.